(12) United States Patent
Taniai et al.

(10) Patent No.: US 6,747,708 B2
(45) Date of Patent: Jun. 8, 2004

(54) PROJECTION METHOD AND SYSTEM UTILIZING A VARIABLE TRANSMITTANCE COLOR SWITCH

(75) Inventors: Takayoshi Taniai, Kanagawa-ken (JP); Naoki Ebiko, Kanagawa-ken (JP); Atsushi Harayama, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 408 days.

(21) Appl. No.: 09/870,170

(22) Filed: May 30, 2001

(65) Prior Publication Data

US 2001/0052947 A1 Dec. 20, 2001

(30) Foreign Application Priority Data

May 31, 2000 (JP) ........................................ 2000-162958

(51) Int. Cl.$^7$ ................................................. H04N 9/31
(52) U.S. Cl. ............................... 348/761; 349/7; 349/9; 359/629
(58) Field of Search ................................. 348/742, 760, 348/656, 657, 761; 345/32, 48; 353/20, 31, 84; 352/203, 42; 359/483, 629, 634, 636, 637; 349/7–9

(56) References Cited

U.S. PATENT DOCUMENTS

| | | | | |
|---|---|---|---|---|
| 5,703,663 A | * | 12/1997 | Fujioka et al. | 349/5 |
| 5,805,243 A | * | 9/1998 | Hatano et al. | 349/5 |
| 5,900,982 A | * | 5/1999 | Dolgoff et al. | 359/619 |
| 6,234,634 B1 | * | 5/2001 | Hansen et al. | 353/20 |
| 6,243,198 B1 | * | 6/2001 | Sedlmayr | 359/483 |

* cited by examiner

Primary Examiner—Victor R. Kostak
(74) Attorney, Agent, or Firm—Flynn, Thiel, Boutell & Tanis, P.C.

(57) ABSTRACT

A single polarizer projector with a color switch and a projection method thereof, wherein the mean luminance of the inputted video signal is calculated so that the transmittance of the color switch can be controlled by the mean luminance in such a fashion that the transmittance is set to a maximum (100%) while setting the same to a low level (50%), thereby preventing unnatural blackening of relatively dark image for improving the contrast ratio.

16 Claims, 7 Drawing Sheets

PROJECTION METHOD AND SYSTEM UTILIZING A VARIABLE TRANSMITTANCE COLOR SWITCH

BACKGROUND OF THE INVENTION (1) Field of the Invention

The present invention relates to a projection method and a projector with a single polarizer and a color switch.

(2) Description of the Prior Art

Nowadays, each projector is required to be capable of providing a good contrast and a good contrast while satisfying the needs of further compactness and lightweight.

Normally, in order for the luminance of the picture to be raised, it is necessary to raise the luminance of the light source lamp. Raising the luminance of the light source, however, has a limitation, since a higher luminance inevitably leads to a larger light source lamp, which results in the increase in the dimensions of related internal parts and their housing. Further, simply raising the brightness of the light source lamp gives rise to a problem that the "black-color abnormality" occurs owing to the increase in the luminance of the black color caused by the leak of the light.

A conventional single polarizer type projector comprising an optical system 10 and a circuit system 11 is given in FIG. 8.

The optical system 10 will be described first.

As shown in FIG. 8, a light source unit 12 includes a light source lamp, an integrator lens, polarized light converter, a beam-condensing element or the like. About 75–85% of the light generated by the light source unit 12 is composed of S-wave (a light component oscillating vertically to the incidence plane), and most of P-wave (a light component oscillating parallelly to the incident plane) is eliminated while passing through the polarizer 13. Of the light substantially composed of the S-wave, the direction of polarization of the bandwidth of one of R, G and B lights can be rotated by a color switch 14.

The color switch 14 comprises 3 pieces of transmission liquid crystal panels respectively for R, G and B lights and phase difference plates, which are respectively designed to rotate only a polarized light having a predetermined wavelength bandwidth, as illustrated in FIG. 9, and are superposed on one another. When the R light has to be created by using the color switch 14, only the polarized light having the wavelength bandwidth of the R light is rotated to obtain a P-wave light, while keeping the wavelength bandwidths of the G and B lights unrotated to maintain the S-waves thereof, whereby the polarized G and B lights are reflected by a polarized beam splitter prism (hereinafter referred to as BPS) 15, while only the polarized R light is transmitted to reach a reflection display panel 16. Of the light of P-wave that has arrived at the reflection display panel 16, only the picture element for display is rotated to be converted into the S-light wave and reflected. Of the light reflected by the reflection display panel 16, only the S wave is reflected in the direction bent by 90° to be finally projected on a screen.

Further, in the case of the reflection display, the sticking due to the memory effect occurs because of the characteristic of the liquid crystal panel, unless the polarity of voltage is changed. Therefore, in order to prevent the black color and white color in a displayed image from being reversed when the polarity is set positive, a doubler 17, comprising a polarizing switching element, is provided before the reflection display panel 16.

Next, the circuit system shown in FIG. 8 will be explained.

The video signal inputted from outside is converted into a picture element suitable for the reflection liquid crystal panel 16 by means of an image processing circuit 18 and corrected by γ correction circuit for the color suited for the display on the reflection display panel 16. The video signal that has undergone such a processing is displayed on the reflection display panel 16 by means of a panel drive circuit 20. In the case of a single-panel projector, as shown in FIG. 1, the display of color image can be made possible by making the color switch 14 by the timely switching of R, G and B and simultaneously by sequentially displaying the R image, G image and B image on the reflection display panel 16.

Therefore, trigger signal from a panel drive circuit 20 is sent to a color switch drive circuit 21 so that the color switch 14 is made to switch the color to be displayed synchronizing with the display on the reflection display panel 16.

The timing of the transmission of the trigger signal from the panel drive circuit 20 to the color switch circuit 21 and that of the transmission of color switch drive signal from the color switch drive circuit 21 to the color switch 14 are shown in FIG. 11. The negative side of the color switch drive signal amplitude serves for preventing the sticking due to the memory effect from occurring on the liquid crystal reflection display panel because of the characteristic thereof, unless the polarity of the impressed voltage is kept unchanged.

In FIG. 11, (a) represents a vertical synchronizing signal; (b) a condition in which R, G and B signals are switched in a reflection display panel; (c) a switch trigger signal outputted at the fall of the vertical synchronizing signal; (d) a condition in which the cell is in off-state when the voltage of each cell (liquid crystal) of the color switch is UV, while the cell is in on-state when the voltage of each cell is VL.

In the case of a conventional single polarizer projector, the color switch 14 is used only for the switching of 3 patterns, i.e., R, G and B, and the reflection display panel 16 is used for the tonal expression of the image. More particularly, since the transmittance of the color switch 14 is always kept constant, if the quantity or intensity of the light is increased in order to raise the brightness of an image, even the degree of the darkness becomes weaker due to the effect of the leaking light, resulting in the separation of the dark portion of the image and insufficient contrast.

BRIEF SUMMARY OF THE INVENTION

An object of the present invention is to provide a projection method and a projector not only capable of suppressing the poor black color matching resulting from raising the luminance of the power source lamp but also capable of raising the contrast.

Further, the present invention relates to a projection method and a projector, the projector comprising a single polarizer projector and a color switch, wherein the luminance of the video signal is calculated; the transmittance of the color switch is controlled according to the mean luminance; the transmittance is set to 100% (a maximum) for bright image; the transmittance is lowered for dark image to prevent the poor black color matching in the case of dark image, thereby improving the contrast of the image.

With respect to a mean luminance calculation circuit for calculating the luminance of the video signal, outputted from an image processing circuit, in converting the R, G and B signals into Y signal respectively, the luminance signal is generated according to an equation, $Y=0.30R+0.59G+0.11B$, which is defined by the NTSC standard.

In converting the R, G and B signals, outputted from an image processing circuit, into Y signal respectively, by the mean luminance calculation circuit for calculating the luminance of the video signal, the scale of the circuit can be reduced by generating the luminance signal by using the equation, Y=0.3125R+0.5625G+0.12500B, a modification of the equation according to the NTSC standard, using the coefficient which can be realized through the bit shift calculation and addition.

With respect to the mean luminance calculation circuit for calculating the luminance of the video signal, the calculation of the mean luminance signal APL is simplified by counting the carry of an adder and by subsequently counting the carry of the counter when converting the R, G and B signals, outputted from the image processing circuit, into Y signal respectively and adding the Y signals during 1V period.

With respect to a color switch drive circuit for driving color switch, both the poor luminance and the blackening of low-luminance image can be suppressed by setting transmittance to 100% when the APL signal is 50% or more while setting the lower limit of the same to 50% when the APL signal is below 50% in determining the transmittance of the color switch according to the APL signal outputted from the mean luminance calculation circuit.

With respect to the color switch drive circuit for driving the color switch, the color switch, whose transmittance varies according to the drive voltage, is controlled by selecting a proper transmittance data of the color switch by using a memory such as a look up table (LUT) when determining the transmittance of the color switch according to the APL signal outputted from the mean luminance calculation circuit, and by converting the transmission data into analog data through a D/A.

With respect to a transmittance setter of the color switch, both the poor luminance and the blackening of a dark image can be suppressed by varying the transmittance, e.g., by setting the transmittance to 100% when the APL signal is 50% or more while setting the lower limit of the transmittance to 50% when the APL signal is below 50% by means of a circuit comprising a combination of several OR gates, in setting the transmittance of the color switch according to the transmittance of the color switch according to the APL signal outputted from the mean luminance calculation circuit.

The occurrence of the blackening can be prevented by controlling the transmittance of the color switch, and by correcting dynamic γ so that the dynamic γ has a larger inclination towards a lower level when the luminance of any given image is relatively low.

The white balance and the color tone are adjusted by separately controlling the transmittances of the R, G and B of the color switch according to the white balance adjusting signal and the color tone adjusting signal outputted from a microcomputer or the like.

As for the color switch, the light, as being a mixture of the P wave light and S wave light, is polarized by a PBS and a polarizer provided before the PBS so that the S wave light to fall on the reflection display panel after passing through the PBS is substantially removed, thereby improving the contrast.

The light to be projected against the screen from the PBS is polarized by an absorption polarizer having a higher polarizing efficiency to remove the P wave and to thereby improving the contrast.

DETAILED DESCRIPTION OF THE INVENTION

Figure 1:
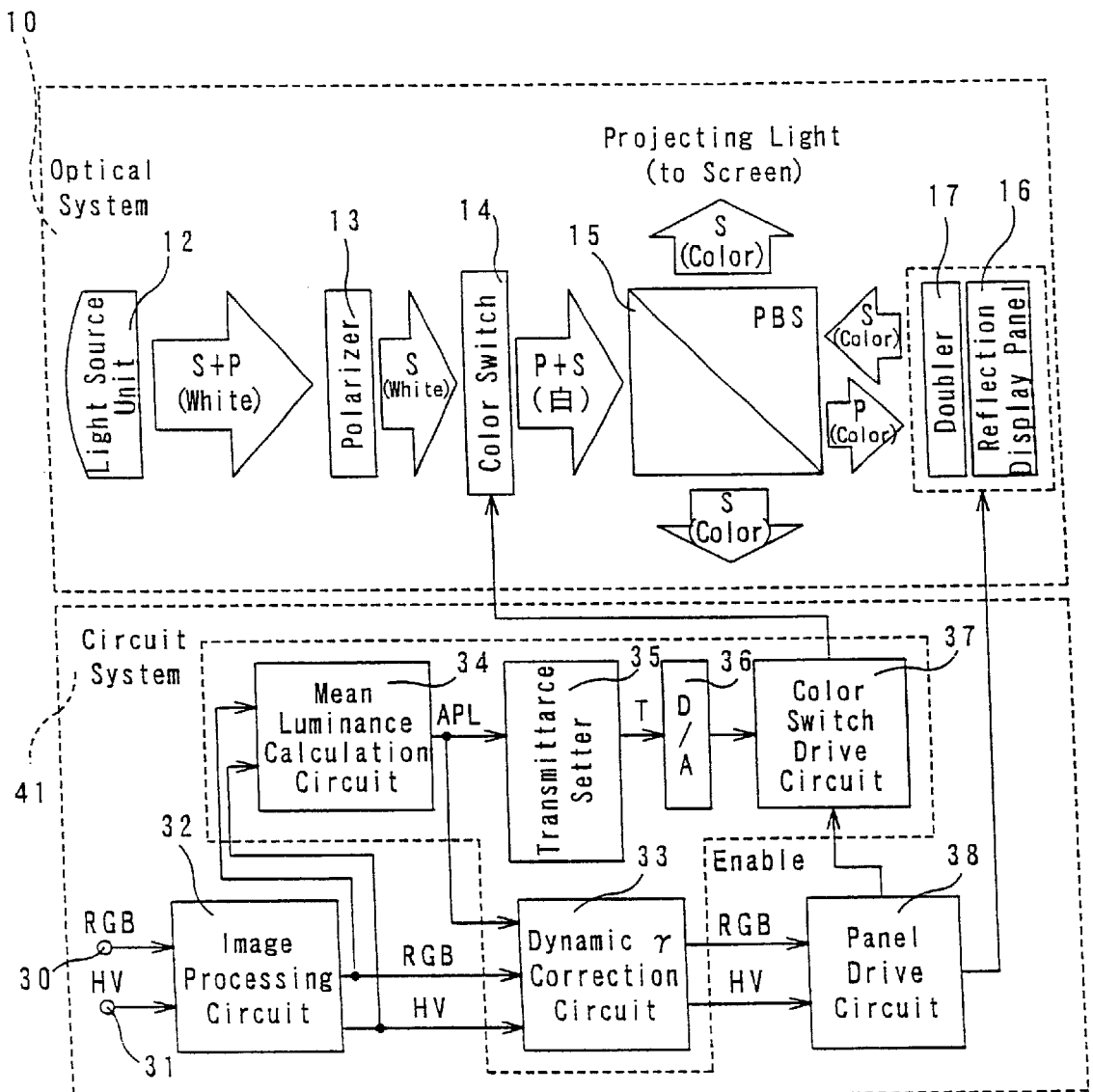
FIG. 1 is a block diagram showing the projection method and the projector as an embodiment of the present invention.

The embodiments of the present invention will be described below referring to the drawings.

The single polarizer projector according to the present invention shown in FIG. 1 comprises an optical system 10 and a circuit system 41. In this projector, the optical system 10 operates on the principle similar to that of the conventional circuit shown in FIG. 8 comprising an optical unit 12, a polarizer 13, a color switch 14, a polarization beam splitter prism 15 (hereinafter referred to as PBS), a reflection display panel 16 and a doubler 17, but the circuit system 41 is one characterizing the present invention and will be described below in detail. In this circuit system, 30 represents the input terminal for R, G and B signals; 31, the input terminal for HV signal; 32, the image processing circuit for converting video signal inputted from the RGB signal input terminal 30 into the picture element suiting to the reflection display panel 16.

Dynamic γ correction circuit 33 corrects the inputted video signal for the color suiting to the reflection display panel 16 according to γ correction curve.

Mean luminance calculation circuit 34 is designed for dividing the mean luminance of the inputted video signal corresponding to one image (hereinafter referred to as APL) into, for example, 32 levels for output.

The transmittance setter 35 sets the drive voltage of the color switch 14 according to the information of the APL from the mean luminance calculation circuit 34.

A D/A conversion circuit 36 converts the digital transmittance data set by the transmittance setter 35 into a corresponding analog data.

A color switch drive circuit 37 is designed to convert the analog data of the transmittance from the D/A conversion circuit 36 into a color switch drive signal with the timing corresponding to that with which the analog data of the transmittance from the D/A conversion circuit 36 is set.

A panel drive circuit 38 is designed not only for outputting the panel drive signal to a reflection display panel 16 but also for outputting the enable signal, for enabling the color switch 14 to be operated accurately synchronously with the display on the panel, to the color switch drive circuit 37.

Next, the function of the single polarizer projector according to the present invention will be explained.

The video signal inputted through the RGB signal input terminal 30, simultaneously with the HV signal inputted through an HV signal input terminal 31, is processed by an image processing circuit 32 for conversion into the picture element suiting to the reflection display panel 16. The dynamic γ correction circuit 33 is designed for correcting the video signal for obtaining the color suiting to the reflection display panel 16, and, in order to adopt the dynamic γ correction circuit 33 designed for providing a γ curve better suiting to the APL of the display screen, the mean luminance calculation circuit 34 becomes necessary; the result of the calculation by the mean luminance calculation circuit 34 is also used for controlling the transmittance of the color switch 14.

The liquid crystal panel used for the color switch 14 operates on the principle similar to that of the ordinary transmission liquid crystal panel, so that the voltage thereof is set by the transmittance setter 35 according to the information of the APL. By controlling the transmittance of the color switch 14 according to the APL, the transmittance is maximized when the image to be displayed is bright, while lowering the transmittance when the image to be displayed is relatively dark, whereby the misfitting of the black can be reduced to improve the contrast effectively.

Next, the drive method of the color switch, an object of the present invention, will be explained in detail.

Figure 2:
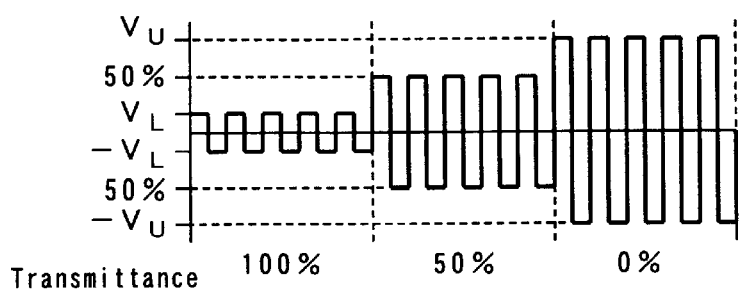
FIG. 2 is a waveform diagram showing an example of the transmittance control by the color switch drive signal for the projection method and the projector according to the present invention.
Figure 11:
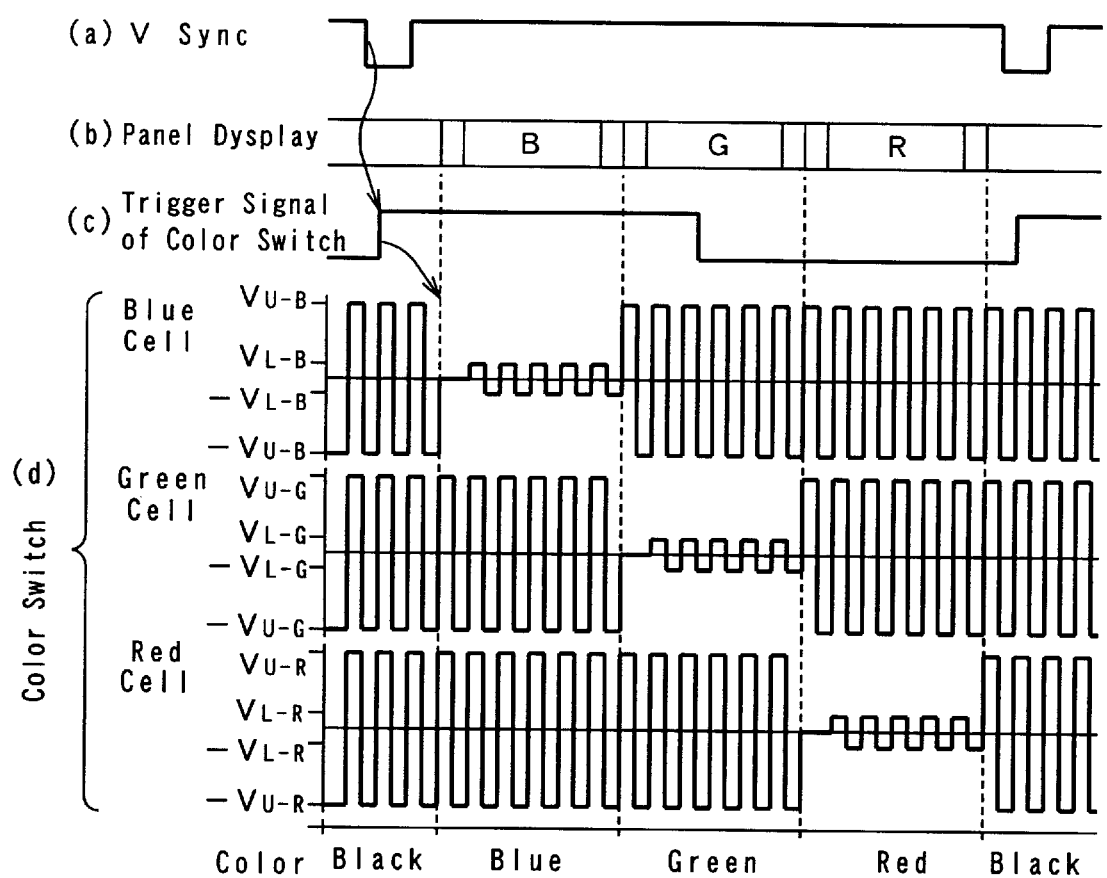
FIG. 11 is a waveform diagram showing the color switch drive timing by a conventional circuit.

Conventionally, as shown in FIG. 11, it has been only method for controlling the on-off operation of the liquid crystal to apply a certain voltage, e.g., VU or VL, to each liquid crystal of the color switch 14, but, according to the present invention, as shown in FIG. 2, the transmittance can be controlled by controlling the voltage to be applied to the liquid crystal to an intermediate level (e.g., 50%).

To describe the calculation method of the APL, first the RGB signal outputted from the image processing circuit 32 is converted into the luminance signal Y through the mean luminance calculation circuit 34. In this case, the luminance signal is generated according to the formula defined by the NTSC method, that is, $$Y = 0.30R + 0.59G + 0.11B \quad (1)$$

When the above formula is applied directly, the scale of the circuit becomes too large, since the coefficients of R, G and B are not given as the coefficients in terms of $\frac{1}{2}^n$ and this necessitates a formula capable of satisfying these coefficients. For this reason, the formula (2) given below, using the coefficients which enable the bit shit operation and the addition to be applied, is substituted.

$$Y = 0.3125(=\frac{1}{2}^2+\frac{1}{2}^4)R + 0.5625(=\frac{1}{2}+\frac{1}{2}^4)G + 0.1250(=\frac{1}{2}^3)B \quad (2)$$

When this formula (2) is applied, the accuracy of the Y signal declines somewhat, but this will not cause any serious problem, since such Y signal is used only for the calculation of the mean luminance.

The Y signal is accumulated throughout the 1V period. Since simply accumulating the Y signal results in the increase in the accumulated value, the carry signal generated by addition is counted, and the carry signal is further counted in order to make the APL signal into a signal of 4–5 bits, i.e., 16–32 different signals.

How to set the transmittance of the color switch 14 will be described referring to FIG. 3.

Figure 3:
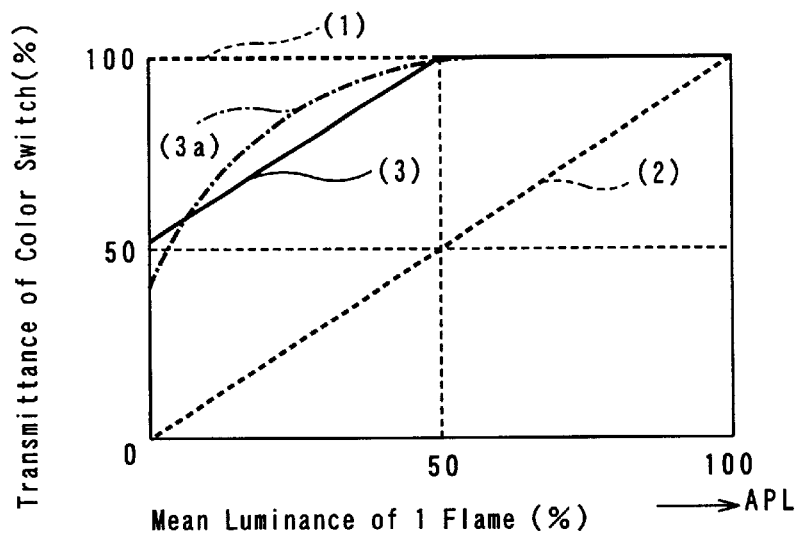
FIG. 3 is a characteristic diagram showing the relationship between the mean luminance and the transmittance according to the present invention.

FIG. 3 is a graph showing the transmittance of the color switch 14 relative to the APL of 1 frame. As seen from the graph of FIG. 3, according to the conventional method, the transmittance, as represented by the dotted characteristic line, is always 100% irrespective the mean luminance level. In consequence, as described above, increasing the light quantity or intensity for increasing the brightness of the image results in the occurrence of unfitting black portion due to the decrease in the blackness caused by leaking light, thereby creating a hindrance to the improvement of the contrast.

When the transmittance is set so as to increase linearly from 0 to 100% relative to the APL as in the case of the characteristic line (2), (the contrast) can be improved partially, but the APL signal value becomes 0 with respect to an image which is dark but not black, resulting in a total blackening condition; further, even when mean luminance level is 50% of that of a fully white image, the transmittance becomes 50%, thereby producing a generally dark image.

Therefore, the present invention is designed so that, as represented by characteristic line (3), the transmittance is set so as to increase linearly from 50% to 100% corresponding to 0% to 50% levels of the APL signal, while setting the transmittance remain constant at 100% level from the point at which the APL signal level exceeds 50% to the point of 100% level regardless of the level of the mean luminance. By setting (the transmittance) to the levels represented by the characteristic line (3), the transmittance level becomes 100% when the image to be displayed is bright one so as not to reduce necessary brightness, while by setting the lower limit of the transmittance to 50% level so that the formation of unfitting black portion caused by the leaking light can be better prevented compared with the case where the transmittance is set as represented by the characteristic line (2).

The present invention is designed so that the transmittance varies only when the mean luminance level is 50% or less, and this corresponds to that the mean luminance of the color bar is 50%. However, the mean luminance level need not be exactly 50%; it may be about 50%. Further, the characteristic line (of the transmittance) to be adopted is not necessarily limited the characteristic line (3) which varies linearly but the characteristic line represented by a curve of secondary degree such as the characteristic line (3a) representing the transmittance increasing quadratically from about 50% to 100% corresponding to the APL signal within 0% to about 50%. These characteristic lines (3) and (3a) may be selected depending on the characteristic of the color switch 14, the brightness of the image to be displayed or the like.

Figure 4:
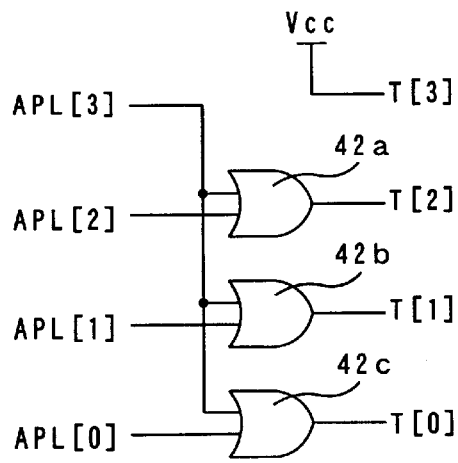
FIG. 4 is a circuit diagram of the transmittance setter 35 as an embodiment of the present invention.

To control the transmittance of the color switch as is discussed above, a memory such as the look up table (hereinafter referred to as LUT) may be incorporated into the transmittance setter 35. In other words, the transmittance can be determined readily by the transmittance setter 35 by previously registering, in the form of the LUT, the transmittance data corresponding to the APL. However, since the circuit of the LUT is required to have a certain scale, if the control of the transmittance to the APL is not required to be made finely, the circuit may be composed 3 OR gates, 42a, 42b and 42c as shown in FIG. 4. The input side 42a of the OR gate is connected to the outputs APL [3] and APL [2] from the mean luminance calculation circuit 34, and similarly the OR gate 42b is connected to APL [3] and APL [1], while OR gate 42c is connected to APL [3] and APL [0]. Further, a 4-bit 16-stage transmittance setter 35 is formed by setting output T [3] to Vcc and by setting the output sides of the OR gates 42a, 42b and 42c to T [2], T [1] and T [0] respectively.

In the arrangement described above, when the levels of APL [3], APL [2], APL [1] and APL [0] on the input side are [LLLL], the level of T [3] on the output side is always [H], so that the levels of T [3], T [2], T [1] and T [0] become [HLLL]. In this case, the transmittance is set to 50%. Further, when the levels of APL [3], APL [2], APL [1] and APL [0] become higher than [LHHH], the levels of T [3], T [2], T [1] and T [0] become [HHHH]. In this case, the transmittance is set to 100%. When the input of the APL varies within the range of input levels [LLLH]–[LHHL], the output levels become [HLLH]–[HHHL], and the transmittance varying sequentially within the aforementioned range can be obtained.

When the transmittance is set as described above, (the transmittance) is converted into an analog data by D/A conversion circuit 36. In the color switch drive circuit 37, the transmittance in the form of analog data is converted into the color switch drive signal with the timing given in FIG. 5.

Figure 8:
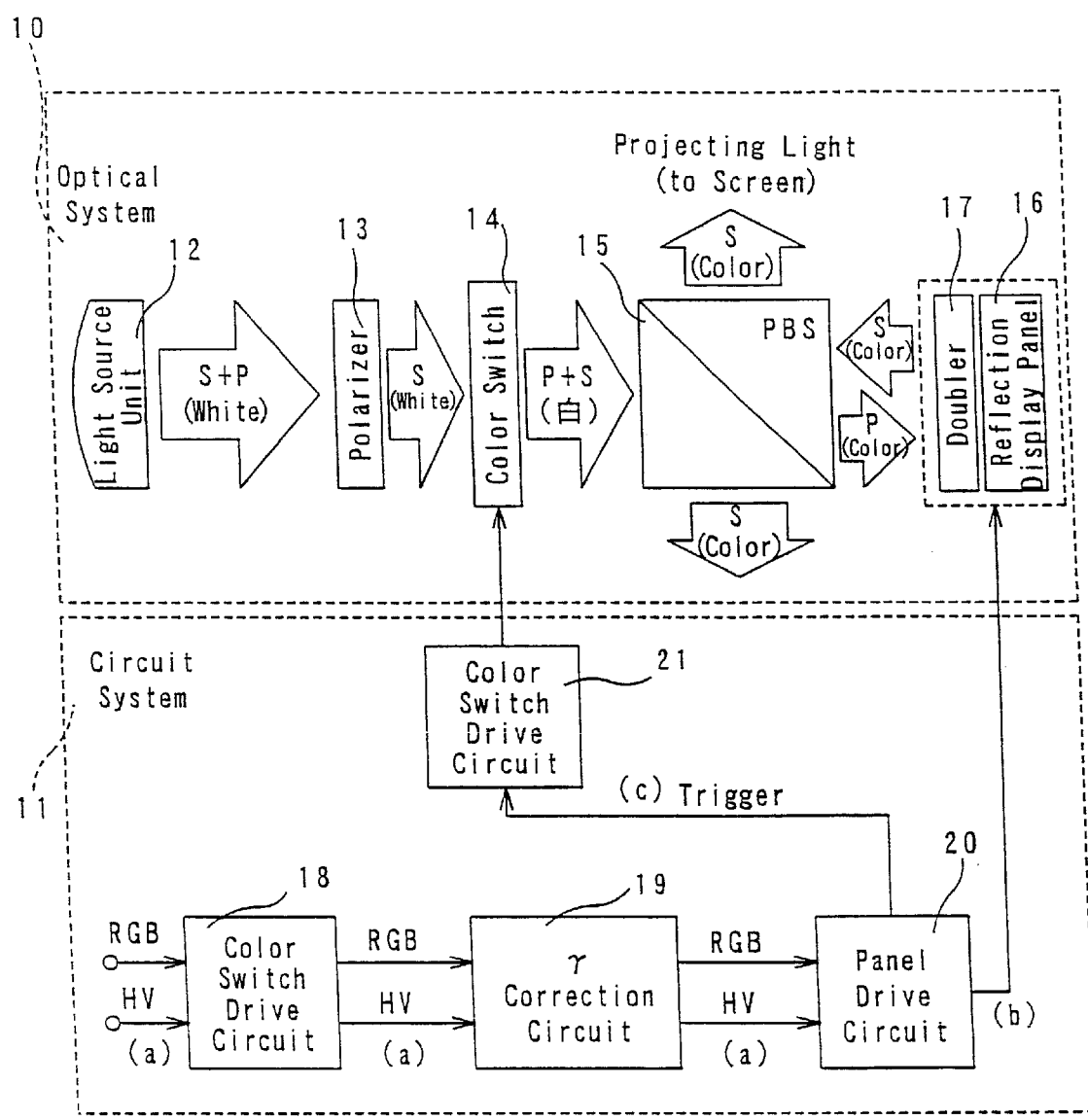
FIG. 8 is a block diagram showing a conventional projection method and a conventional projector.
Figure 9:
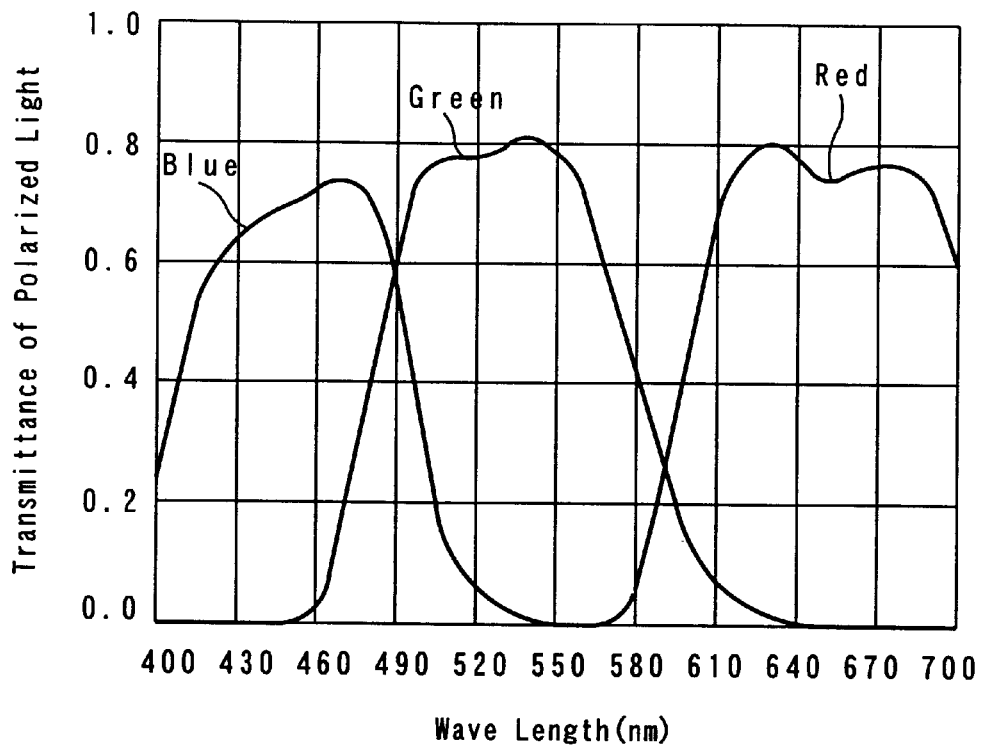
FIG. 9 is a polarization characteristic diagram of the phase difference plate of the color switch.
Figure 10:
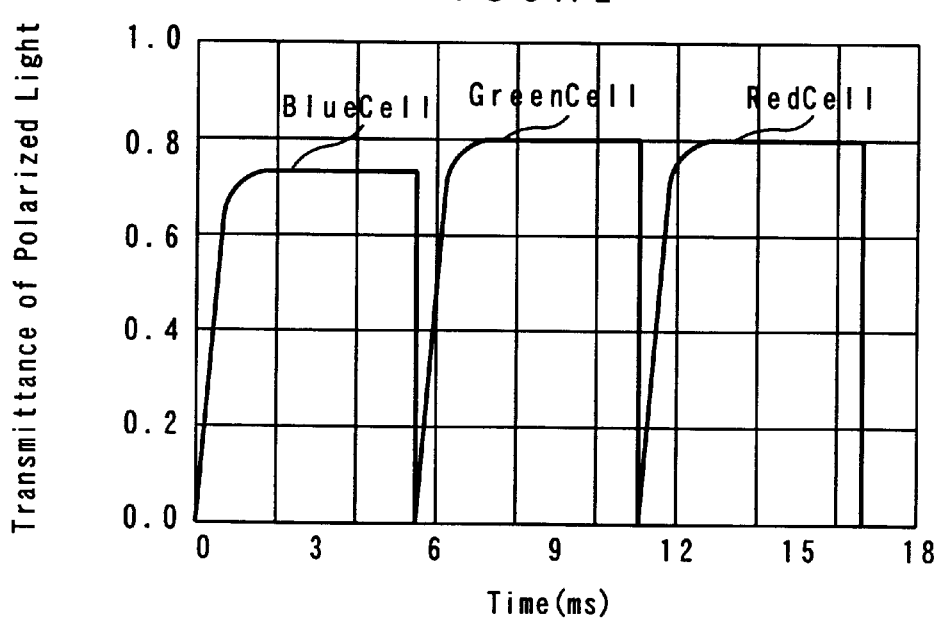
FIG. 10 is a waveform diagram showing the color switching timing by the color switch.

In the conventional color switch drive circuit 21 shown in FIG. 8, the transmittance is not controlled, and each of the liquid crystals of the color switch 14 is kept turned on for a certain period of time responding to the trigger signal delivered from the panel drive circuit 20.

In contrast, in the case of the color switch drive circuit 37 according to the present invention, not only the transmittance of the color switch 14 is controlled but also the enable signal for each liquid crystal of the color switch 14 is received from the panel drive circuit 38, so that the color switch 14 can be switched accurately synchronizing with the display on the reflection display panel 16.

Figure 5:
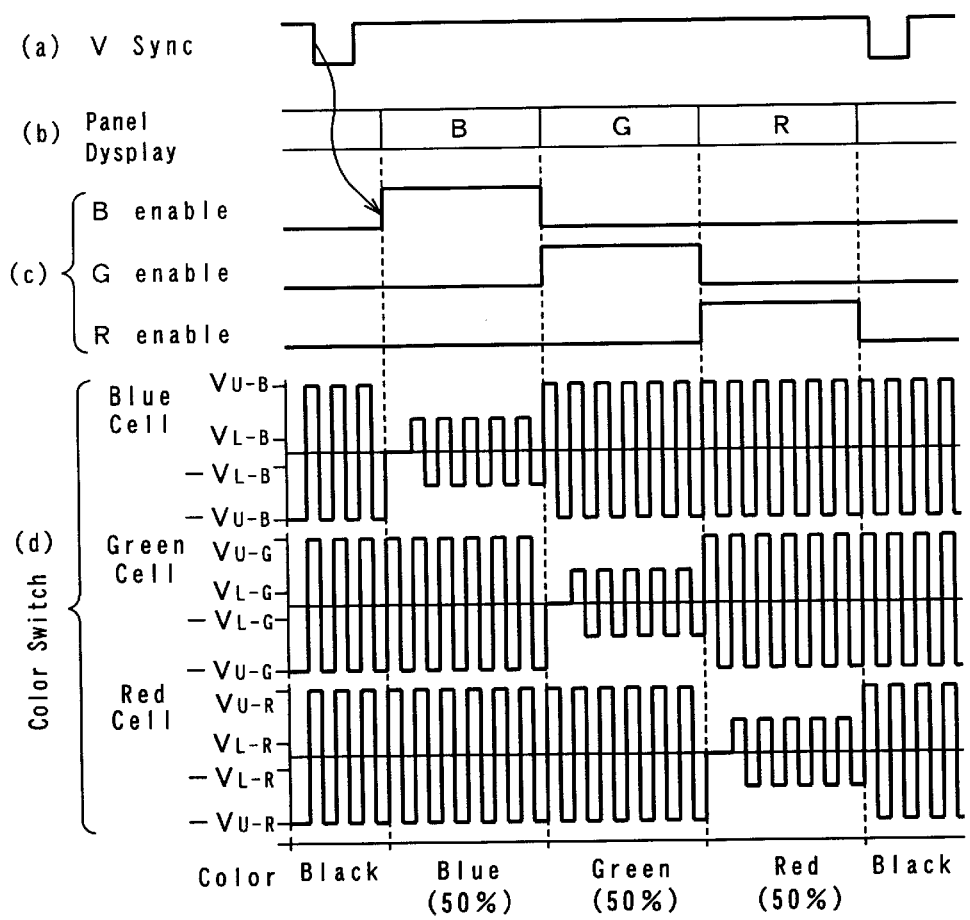
FIG. 5 is a waveform diagram showing the color switch drive timing according to the present invention.

More specifically, in FIG. 5, (a) represents a vertical synchronizing signal; (b), the condition of switching display according to the R, G and B signals on the reflection display panel; (c), B enable, G enable and R enable signals to be outputted at the fall of the vertical synchronizing signal; (d), the condition that the transmittance is 0% when the voltage of each cell (liquid crystal) of the color switch 14 is UV, the cell is turned off corresponding to the transmittance of 0%, while when the voltage is VL, the cell is turned on corresponding to the transmittance of 100%, and when the voltage is between the UV and VL, the transmittance is 50%.

As described above, the contrast ratio can be improved by controlling the transmittance of the color switch 14, but controlling the transmittance to low levels can cause the blackening of the image when the image to be displayed is relatively dark one. However, in the case of the present invention, the dynamic γ correction circuit 33, designed for correcting the γ curve according to the mean luminance of the image, is provided so that the inclination of the γ curve is increased towards lower levels when the image to be displayed is relatively dark one while decreasing the inclination towards higher levels, thereby preventing the blackening of the image.

Since the transmittance of the color switch can be varied by varying the voltage to be applied the color switch, the white balance and the color tone of the image can be adjusted by controlling the voltages to be applied to the R, G and B liquid crystals of the color switch 14 independently from one another.

Figure 6:
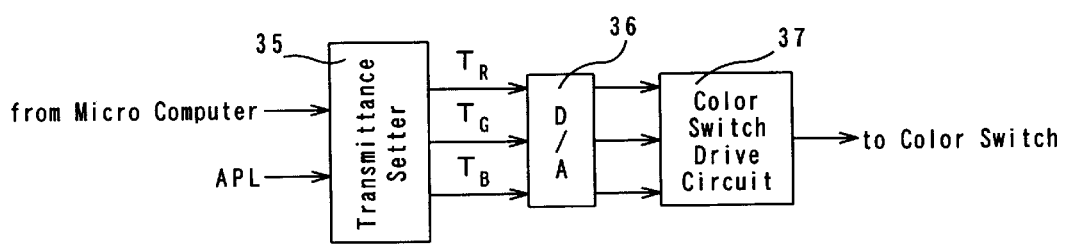
FIG. 6 is a block diagram showing an example of the white balance control and the color tone control by the color switch.

FIG. 6 is a block diagram illustrating the process of adjusting the white balance and the color tone by the color switch 14; according to this process, the general transmittance of the color switch 14 is set by the APL from the mean luminance calculation circuit, but the voltages to be applied the R, G and B liquid crystals are differentiated to some extent according to the white balance adjusting signal or the color tone adjusting signal outputted from the microcomputer or the like, thereby differentiating the transmittance for varying the white balance and the color tone.

In FIG. 1, the light passing through the color switch 14 comprises the P wave component and the S wave component due to the effect of the polarization. The light is separated into the P wave and the S wave by the PBS 15, but, since the polarizing performance of the PBS 15 is not so high, S wave, which is not primarily supposed to arrive at the reflection display panel 16, arrives at the reflection display panel 16 together with the P wave, which is primarily supposed to arrive at the reflection display panel 16. In consequence, when, for example, a black image has to be displayed, the S wave component is reflected by the reflection display panel 16 and projected on the screen by the PBS 15, causing the occurrence of unfitting black color.

Figure 7:
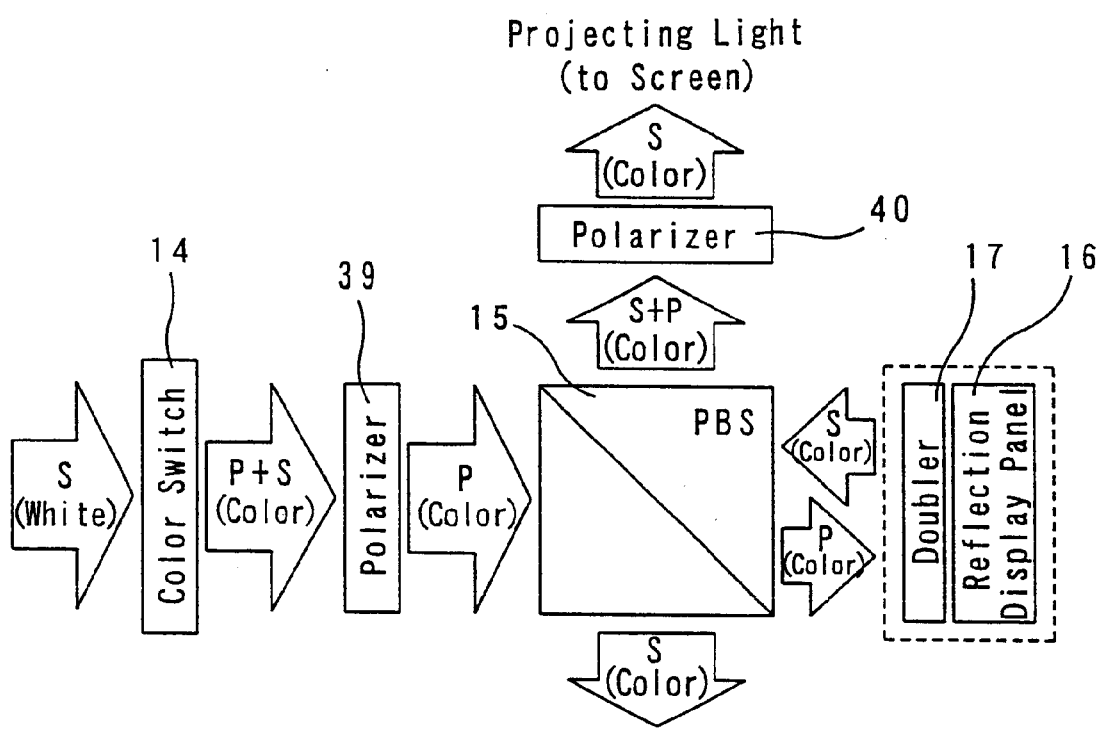
FIG. 7 is a block diagram with additional polarizer for improving the contrast according to the present invention.

Thus, in order to resolve such a problem, a second polarizer 39 is provided between the color switch 14 and the PBS 15 as in FIG. 7 so that the light, which comprises the P wave and the S wave and have passed through the color switch 14, is separated from the S wave by the second polarizer 39 to permit only the P wave to pass through the PBS 15 to arrive at the reflection display panel 16 and to improve the contrast ratio, thereby contributing to reducing the occurrence of unnatural black color and the resulting improvement of the contrast ratio.

Further, the light, from the PBS 15, to be projected on the screen includes P wave component, though being small in magnitude, besides the S wave component. Therefore, this P wave component is substantially eliminated by a third polarizer 40 interposed between (the PBS and the screen) as shown in FIG. 7, thereby contributing to further improvement of the contrast ratio. In this case, even if an absorption polarizer, having a higher polarizing efficiency than the ordinary polarizer, is adopted as the third polarizer 40, this will not cause any heat problem, but it rather contributes to the improvement of the contrast ratio.

According to the present invention, the mean luminance of the video signal is calculated so that the transmittance of the color switch is controlled on the basis the mean luminance, whereby the transmittance is set to 100% when the image to be displayed is relatively bright one, while setting the transmittance to lower levels as the image to be displayed is relatively dark ones, and, by doing so, not only the occurrence of unnatural blackening, which is apt to occur by simply raising the brightness of the light source, can be prevented but also the contrast ratio can be improved.

Concerning the mean luminance calculation circuit designed for calculating the mean luminance of the video signal, the scale of the circuit can be reduced where the video signal is generated on the basis of a modified formula according to the NTSC standard, that is, Y=0.3125R+0.562G+0.1250B including the coefficients which enable the bit shift operation and addition is used in converting the R, G and B signals, outputted from the image processing circuit, into the luminance signals Y.

In the mean luminance calculation circuit designed for calculating the luminance of the video signal, when accumulating the Y signals, outputted from the image processing circuit for being converted into Y signal, for 1V period, the carry signals, occurring with the addition by the adder, are counted, and, by this counting, the calculation process of the mean luminance signal APL can be simplified.

As for the color switch drive circuit, in setting the transmittance of the color switch according to the APL signal calculated on the basis of the input video signal, the insufficient luminance and unnatural blackening of relatively dark image can be prevented by setting the luminance to a maximum level when the mean luminance signal level is about ½ or more, while varying the lower limit of the luminance level to about ½ or less of the maximum transmittance.

As for the color switch drive circuit, in setting the transmittance of the color switch according to the APL signal calculated on the basis of the input video signal, (the transmittance) is stored in a memory so that an appropriate transmittance data of the color switch can be selected from the memory for being converted into an analog data by means of the D/A (converter) and for being used for controlling the color switch whose transmittance varies according to the drive voltage.

As for the transmittance setter of the color switch, in order to set the transmittance of the color switch according to the APL signal outputted from the mean luminance calculation circuit, a circuit composed of a combination of a plurality of OR gates is provided so that the transmittance can be varied so as to be set to 100% when the APL signal is 50% or more while setting the lower limit of the transmitting to 50% when the APL signal is 50% or less, whereby the insufficient luminance and unnatural blackening of the relatively dark images can be prevented.

Thus, the occurrence of unnatural blackening of the image can be prevented by controlling the transmittance of the color switch and by correcting the dynamic γ so that the dynamic γ inclines toward the side of lower levels when the image to be displayed is relatively dark.

The white balance and the color tone of the image to be displayed can be adjusted by independently controlling the transmittances of the R, G and B (cells) of the color switch according to the white balance adjusting signal or the color tone adjusting signal outputted from the microcomputer or the like.

The light, comprising the P wave component and the S wave component, which has passed through the color switch is further passed through the second polarizer so that its S wave component is eliminated and only the P wave component thereof is permitted to reach the reflection display panel after passing through the polarization beam splitter prism, whereby the occurrence of the unnatural blackening of the image can be suppressed, resulting in the improvement of the contrast ratio.

The contrast ratio can be improved further by removing the slightly remaining P wave component of the light to be projected on the screen coming from the polarization beam splitter prism by further polarizing the light by the third polarizer. Further, even if a absorption polarizer is used as the third polarizer, this will not cause any heat problem but rather contribute to the improvement of the contrast ratio, since, in the case of the single polarizer projector, only the light of single color is projected on the screen.

What is claimed is:

1. A single polarizer projector system, designed for displaying color image on a display panel by switching the color to be displayed by a color switch, comprising:
    an image processing circuit for processing a video signal, input into the system, into an appropriate format suitable for said display panel;
    a mean luminance calculation circuit for converting R, G and B signals, outputted from said image processing circuit, into a luminance (Y) signal from which can be calculated a mean luminance during a 1V period;
    a transmittance setter for setting a transmittance of said color switch according to an output from said mean luminance calculation circuit;
    a color switch drive circuit for driving said color switch according to said output from said transmittance setter; and
    a panel drive circuit for sending the inputted video signal to said display panel and a synchronizing trigger signal to said color switch drive circuit.

2. The projector system defined in claim 1, further comprising a dynamic γ correction circuit for controlling the transmittance of said color switch according to said luminance signal and preventing an occurrence of unnatural blackening of the image by adjusting a characteristic of dynamic γ correction so that an inclination towards lower γ levels is increased when the image to be displayed is relatively dark.

3. The projector system defined in claim 1, wherein said transmittance setter is capable of separately controlling the transmittances of the R, G and B (cells) of said color switch according to a white balance adjusting signal or a color tone adjusting signal outputted from a microcomputer or the like to adjust the white balance or the color tone of the image to be displayed.

4. The projector system defined in claim 1, further comprising:
    a first optical path for enabling light from a light source unit to reach said display panel through a first polarizer, said color switch, a second polarizer and a polarization beam splitter prism; and
    a second optical path for enabling the light reflected by said display panel to reach a screen through said polarization beam splitter prism,
    wherein the light produced by said light source unit is made to pass through said first polarizer so as to be substantially reduced to only an S wave component, whereupon said S wave component is converted into a color to be displayed by said color switch, said colored light, which comprises both a P wave component and a S wave component, is made to pass through said second polarizer to remove the S wave component, thereby allowing only the P wave component to reach said display panel, leading to an improved contrast ratio of the image.

5. The projector system defined in claim 1, further comprising:
    a first optical path for enabling light from a light source unit to reach said display panel through a first polarizer, said color switch and a polarization beam splitter prism;
    a second optical path for enabling the light reflected by said display panel to reach said screen through said polarization beam splitter prism and a second polarizer;
    wherein the light produced by said light source unit is passed through said first polarizer to be substantially reduced to an S wave component, whereupon the S wave component is passed through said color switch and then through said polarization beam splitting prism to the display panel, and whereupon the light reflected by said display panel and polarized by said polarization beam splitting prism in order to be projected on the screen is polarized by said third polarizer to remove any P wave component included in the light reflected by said display panel, thereby improving the contrast ratio.

6. The projector system defined in claim 5, wherein an absorption polarizer having a high polarizing efficiency is employed as said second polarizer.

7. A method of displaying an image using a projection display system, comprising the steps of:
- inputting a video signal into said projection display system;
- projecting a multi-spectrum beam of light onto a color switch;
- selectively allowing a limited-spectrum of light derived from said multi-spectrum beam of light to pass through said color switch and project onto a reflective display panel;
- synchronizing control of said reflective display panel with said color switch so that an image displayed by said reflective display panel corresponds to said limited-spectrum of light passed through said color switch;
- calculating a mean luminance of said video signal based on R, G and B components of said video signal; and
- selectively adjusting a transmittance of said color switch based on said calculated mean luminance of said video signal input into said projection display system.

8. The image displaying method according to claim 7, wherein the transmittance of said color switch is selectively adjusted to a maximum for a first image but is reduced for a second image, where said first image is relatively bright in comparison to said second image, and, accordingly, said second image is relatively dark in comparison to said first image.

9. The image displaying method according to claim 7, wherein the mean luminance of the video signal input into said projection display system is calculated based on a luminance signal generated according to the luminance calculation formula Y=0.30R+0.59G+0.11B as specified by the National Television Systems Committee (NTSC) standard for converging R, G and B signals of a video signal.

10. The image displaying method according to claim 7, wherein the mean luminance of the video signal input into said projection display system is calculated based on a luminance signal generated according to the luminance calculation formula Y=0.3125R+0.5625G+0.1250B.

11. The image displaying method according to claim 10, wherein said luminance calculation formula utilizes coefficients derived from an application of a bit shift operation to a luminance calculation formula specified by the National Television Systems Committee (NTSC) standard for converging R, G and B signals of a video signal.

12. The image displaying method according to claim 7, wherein the mean luminance of the video signal input into said projection display system is calculated based on a luminance signal generated according to either a luminance calculation formula Y=0.30R+0.59G+0.11B conforming to the National Television Systems Committee (NTSC) standard or a luminance calculation formula Y=0.3125R+0.5625G+0.1250B conforming to the NTSC standard, a step of counting carry signals occurring with an addition by an adder where the Y signal is accumulated for a 1V period, and a step of counting the carry signals.

13. The image displaying method according to claim 7, wherein the transmittance of said color switch, as controlled by a color switch drive circuit, is set to a maximum when said calculated mean luminance of said video signal exceeds a threshold value, and wherein said transmittance of said color switch is prevented from dropping below substantially 50% of said maximum transmittance when said calculated mean luminance of said video signal drops below said threshold value.

14. The image displaying method according to claim 13, wherein said calculated mean luminance threshold value is substantially equivalent to 50% of a maximum luminance.

15. The image displaying method according to claim 13, wherein data representing a relationship between said mean luminance of said video signal and said transmittance of said color switch is previously stored in a memory of said projection display system, and upon calculation of said mean luminance of an actual video signal, said memory is queried and data correlating to said calculated mean luminance is retrieved from said memory and used to control a drive voltage of said color switch in order to vary the transmittance of said color switch.

16. The image displaying method according to claim 7, wherein a transmittance setting circuit, comprising a plurality of OR gates, sets the transmittance of said color switch in response to receiving said calculated mean luminance of said video signal input into said projection display system.

* * * * *